US006921121B2

(12) United States Patent
Schneider et al.

(10) Patent No.: US 6,921,121 B2
(45) Date of Patent: Jul. 26, 2005

(54) SUN VISOR ASSEMBLY TO BE USED WITH AN OVERHEAD AIRBAG

(75) Inventors: David W. Schneider, Waterford, MI (US); David L. Dominssini, Allen Park, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/645,651

(22) Filed: Aug. 21, 2003

(65) Prior Publication Data

US 2005/0040667 A1 Feb. 24, 2005

(51) Int. Cl.[7] .................................................. B60J 3/00
(52) U.S. Cl. .................. 296/97.1; 296/97.9; 296/97.12; 280/730.1
(58) Field of Search .............................. 296/97.1, 97.5, 296/97.9, 97.12, 97.13; 280/728.2, 730.1

(56) References Cited

U.S. PATENT DOCUMENTS

| 4,536,008 A | 8/1985 | Brown, Jr. | |
| 6,173,990 B1 | 1/2001 | Nakajima et al. | |
| 6,179,366 B1 | 1/2001 | Hansz | |
| 6,334,626 B2 | 1/2002 | Nakajima et al. | |
| 6,367,872 B1 | 4/2002 | Bohm et al. | |
| 6,547,308 B2 | 4/2003 | Hamelink et al. | |
| 6,588,793 B2 | 7/2003 | Rose | |
| 6,604,773 B2 * | 8/2003 | Aoki et al. | 296/97.9 |
| 2004/0090050 A1 * | 5/2004 | Dominssini et al. | 280/730.1 |

FOREIGN PATENT DOCUMENTS

JP          7-117605         5/1995

* cited by examiner

Primary Examiner—Joseph D. Pape
(74) Attorney, Agent, or Firm—Sally J. Brown

(57) ABSTRACT

A sun visor assembly for a vehicle to be used in conjunction with an overhead airbag is disclosed. The sun visor assembly includes a visor panel, a pivot rod, and a mount for securing the sun visor assembly to the vehicle. The sun visor assembly also has a deflecting element for allowing the visor panel to be deflected out of the path of an inflating overhead airbag. The deflecting element could be a detachable catch mechanism that holds the visor panel in an operational position until the airbag deploys. The deflecting element could also be a spring loaded pivot or crease disposed within the body of the visor panel. The deflecting element could further be a tear seam or flexible fabric for channeling the trajectory of the overhead airbag.

19 Claims, 8 Drawing Sheets

SUN VISOR ASSEMBLY TO BE USED WITH AN OVERHEAD AIRBAG

BACKGROUND OF THE INVENTION

1. Field of the Invention

The present invention relates to sun visor systems for use in motor vehicles. More specifically, the present invention relates to a sun visor assembly used in conjunction with an overhead airbag.

2. Description of Related Art

Sun visors of various constructions have been used in vehicles for shielding the vehicle occupant's eyes from the passage of sunlight through an upper portion of the vehicle's windshield or side window. Conventional sun visors usually consist of a single panel attached to a pivot rod that provides structural support for the panel and allows the panel to swivel from either the windshield or the side window to block incident sun rays. Most sun visors typically are attached to the vehicle header rail through the headliner on an outboard side of the vehicle. A second mount is often used on the inboard side of the vehicle which serves as a detachable clip for the pivot rod so the sun visor can be secured in its storage position, but then pivot to cover the side window if desired.

Attaching the sun visor to the header allows for the sun visor to be rigidly connected to the vehicle so the visor does not detach from or damage the headliner when a vehicle occupant moves the visor from its storage position to a deployed position covering the upper portion of the windshield or side window. Attaching the sun visor to the header also has been used as a way to keep the headliner secured to the roof of the vehicle.

Another device often used in vehicles is inflatable airbags, which have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

Most airbag apparatuses have been primarily designed for deployment in front of the torso of an occupant between the occupant's upper torso and the instrument panel. Conventional airbag modules for frontal occupant protection deploy from the instrument panel (passenger side) or from the steering wheel (driver side). This location has several disadvantages including poor out of position performance and unaesthetic visible instrument panels or steering wheel tear seams.

A more progressive approach to airbag apparatuses has been to install airbag modules between the roof and the headliner of a vehicle. The use of overhead airbags addresses some of the problems and needs associated with conventional airbags. When an overhead airbag is initially deployed, the cushion inflates substantially parallel to the windshield. The cushion descends from proximate the header of the vehicle to cover a majority of the area between the occupant and the front of the vehicle interior. The cushion then expands toward the expected occupant position. This arrangement provides better out of position protection by protecting the occupant from impact with the front window, flying shards of glass, and other projectiles. The overhead airbag may also help to keep the occupant inside the vehicle during an endover or hard frontal collision rollover accident.

One concern regarding the use of overhead airbags is the interaction of the deploying cushion with the sun visor. Conventional sun visors are attached to the header rail of the vehicle, such that the visor pivot arm is in the path of the deploying overhead airbag. As the airbag rapidly inflates, its interaction with the pivot rod or the visor panel can cause the visor to separate from its attachment or become fragmented, creating a dangerous projectile that is capable of injuring the vehicle occupants.

Furthermore, since the pivot arm of a conventional sun visor is located in the path of airbag deployment, the sun visor can impede the trajectory of the deploying airbag. This causes poor positioning of the cushion and inadequate occupant restraint. Consequently, the risk of occupant injury increases, including injury caused by the airbag itself.

The use of some non-conventional visors in conjunction with overhead airbag applications can also be problematic. For instance, vehicle occupants may find it frustrating if their non-conventional visor operates in a significantly different fashion from what they are used to in a conventional visor system. Moreover, some non-conventional visors may be expensive to install if it requires installation procedures much different from conventional systems.

Moving a conventional visor from its common position on the vehicle header also poses a dilemma. The vehicle header provides structural support for a rigid attachment of the sun visor to the vehicle. Without the structural support supplied by the header the sun visor would become easily detached from the more flimsy headliner when actuated by an occupant. Permanent damage to the headliner could occur by the force applied to the visor assembly when a vehicle user actuates the visor. Furthermore, the sun visor attachment is typically used to mount the headliner to the header keeping the headliner proximate the vehicle roof. By not mounting the visor to the header, the headliner will not maintain rigidity and could become detached from the roof.

Accordingly, a need exists for a sun visor assembly that addresses the problems associated with the use of overhead airbags. Specifically, a sun visor assembly is needed which will prevent the deploying airbag cushion from impinging on the sun visor pivot rod so that the sun visor does not fragment or separate from its attachment possibly causing injury to the vehicle occupants. It is also desirable for the sun visor not to impede the trajectory of the deploying overhead airbag so the cushion is positioned correctly and proper occupant restraint is achieved.

It is further desirable that the overhead airbag-compatible sun visor assembly operate in a similar fashion as conventional visor systems so vehicle occupants are not frustrated by a use different from what they are accustomed to. Additionally, it is preferable that a sun visor system for use in conjunction with overhead airbags use a similar installation procedure as a conventional visor system so that the new system is simple to install, thereby creating a cost savings.

It is also desirable that a sun visor attachment system that meets the above needs also have rigid structural support through attachment to the header so that the sun visor does not deform or become detached from the headliner when a vehicle user actuates the visor.

The present invention as disclosed and claimed herewith meets these needs.

SUMMARY OF THE INVENTION

The apparatus of the present invention has been developed in response to the present state of the art, and in particular, in response to the problems and needs in the art that have not yet been fully solved by currently available sun visor systems. Thus, the present invention provides a sun visor assembly for a vehicle to be used in conjunction with an overhead airbag. The sun visor assembly avoids the problems associated with a deploying overhead airbag impinging against the pivot rod of a conventional sun visor by allowing the sun visor to be easily deflected out of a trajectory of the rapidly expanding airbag cushion upon deployment.

In accordance with the invention as embodied and broadly described herein in the preferred embodiment, a sun visor assembly for a vehicle to be used in conjunction with an overhead airbag is provided. According to one configuration, the sun visor assembly may include a visor panel for shielding sun light from the eyes of a vehicle passenger. The sun visor assembly also has a visor pivot rod that is bent at almost a ninety degree angle. When the sun visor is actuated, such that the visor panel is perpendicular to the roof of the vehicle, the portion of the pivot rod that is also perpendicular to the roof of the vehicle is connected to the visor member by a catch mechanism. The catch mechanism could be located near the top edge of the visor panel and it retains the visor panel adjacent the pivot rod until a force disengages the catch mechanism so the visor panel is no longer adjacent the portion of the pivot rod heretofore described. The catch mechanism could be a ball and spring detent, a frangible nylon pin or a detachable sewn on strap.

The portion of the pivot rod that is parallel to the roof of the vehicle when the sun visor is actuated is rotatably connected to the bottom edge of the visor panel. This allows the visor panel to rotate along an axis collinear with this portion of the pivot rod when the visor panel is released from the catch mechanism holding the visor panel adjacent the first perpendicular portion of the pivot rod. When the overhead airbag deploys, the expanding airbag cushion or the overhead airbag module door impinges against the visor panel with a force sufficient to release the visor panel from the catch mechanism so it swings out of the trajectory of the deploying overhead airbag without fragmenting or separating the visor assembly from the header rail.

A mount pivotably interconnects the pivot rod and the header rail of the vehicle frame on the outboard side of the vehicle such that the visor panel can be placed in a storage position substantially parallel to the plane of the vehicle roof. The visor panel can also be placed into at least two deployed positions: the first covering the upper portion of the windshield, and the second covering the upper portion of a side window.

Alternatively, the sun visor assembly may have a visor panel that is connected to a pivot rod that runs along the top edge of the visor panel. The visor panel can rotate along an axis collinear with the pivot rod so the visor panel can be disposed in a storage position or several deployed positions covering the upper portion of the vehicle windshield.

The visor panel is retained in the storage position by a locking mechanism that engages the bottom edge of the visor panel. The locking mechanism could have a release lever that allows a vehicle passenger to release the visor panel from the storage position. When the visor panel is released from the locking mechanism, the panel automatically moves to a first deployed position by virtue of gravity or mechanical means, such as a spring. The visor panel also can bend along a length between and parallel to the top and bottom edges of the visor panel. This temporary deformation is accomplished by use of a spring loaded pivot located in the body of the visor panel or a crease formed along the desired bending location. The temporary deformation of the visor panel allows the overhead airbag to bend the visor panel and disengage it from the locking mechanism when the airbag is deploying. The visor panel then swings from the storage position out of the trajectory of the deploying overhead airbag.

Once the visor panel is in the first deployed position, the vehicle passenger can dispose it in several different deployed positions each at a different angle respective to the roof of the vehicle. The visor panel is retained in the desired deployed position by a detent mechanism such as a spring and ball. The visor panel can also be disposed in a deployed position that covers the upper portion of the side window of the vehicle. The visor can swivel to this position by virtue of the pivot rod being pivotably connected to a mount on the outboard side of the vehicle. The mount interconnects the sun visor and the vehicle header. A second mount on an inboard side of the vehicle can be used as a detachable clip for securing the sun visor to the vehicle header. In a two-mount system the pivot rod could interconnect the two mounts. The sun visor, however, must be detachable from the second mount so that the visor panel can be deployed in the position that covers the upper portion of the side window.

According to another alternative, the sun visor assembly may comprise a visor panel that has a portion that can deform out of the path of the overhead airbag when it impinges against the visor panel upon deployment. The deforming portion of the visor panel could be flexible fabric or a tear seam that gives way, but does not fragment, when the force of the deploying airbag cushion strikes it. The deforming portion of the visor panel could also form a channel when it deforms to guide the deployment of the overhead airbag upon activation into its proper deployment position. The deforming portion of the visor could be located near the top edge of the visor panel.

The sun visor assembly has a mount on an outboard side of the vehicle that interconnects the header and the sun visor. The sun visor is pivotably connected to the mount so that the visor panel can be kept in a storage position and at least two deployed positions covering either the upper portion of the windshield or the upper portion of the side window of a vehicle. The sun visor assembly may further include a second mount on an inboard side of the vehicle for securing the sun visor to the header. The sun visor, however, can disengage from the second mount so that the visor panel can be deployed in the position that covers the side window.

The sun visor assembly also has a rod that extends throughout the body of the visor panel. The rod does not run alongside the top edge of the visor panel, so it does not interfere with the deploying overhead airbag. In one configuration the rod runs from the first mount and adjacent the outboard edge of the visor panel. The rod then turns and extends along the bottom edge of the visor panel toward the inboard side. In this configuration the rod provides an L-shape throughout the body of the visor.

In another configuration the rod further extends from the bottom edge on the inboard side up toward the top edge alongside the inboard edge of the visor panel. The rod then detachably connects to the second mount. In this configuration the rod provides a U-shape throughout the body of the visor.

In a third configuration, the rod member extends from the outboard mount to the outboard edge of the visor panel approximately midway between its top and bottom edge. The rod then extends the length of the visor panel midway between, but parallel to the top and bottom edges. The visor panel is connected to the rod in a way that allows for rotation of the visor panel along an axis collinear with the intersecting rod. This allows the visor panel to easily rotate out of the trajectory of an inflating overhead airbag so that the visor does not fragment or separate from its attachment.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8D, is not intended to limit the scope of the invention, as claimed, but is merely representative of presently preferred embodiments of the invention.

Figure 1:
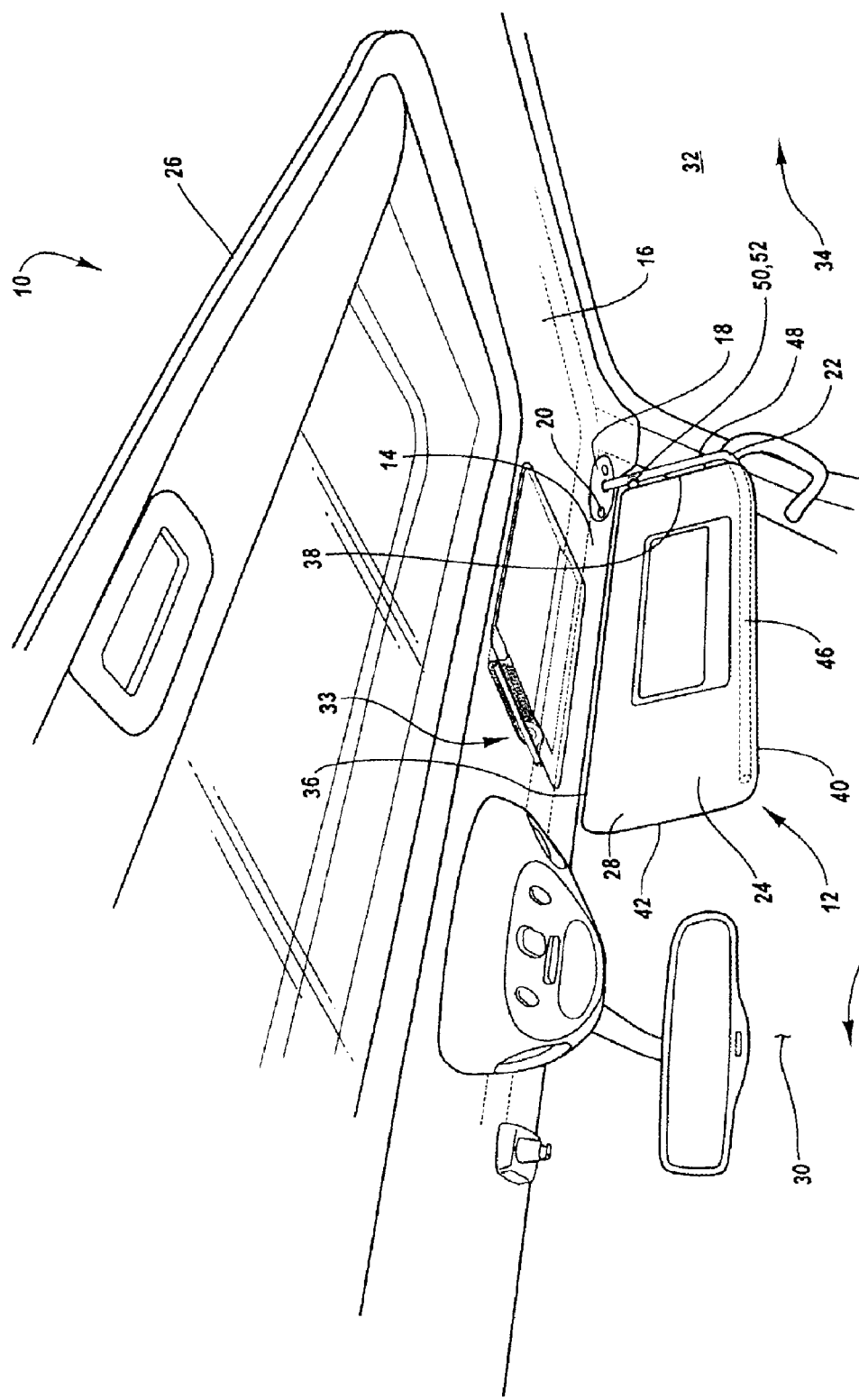
FIG. 1 is a perspective view of the inside of a motor vehicle incorporating one embodiment of a sun visor assembly in the first deployed position, below an overhead airbag module.

Referring to FIG. 1, a perspective view of an inside passenger compartment of a vehicle 10 is depicted. A sun visor assembly 12 is shown mounted to the header rail 14 through the headliner 16 by a visor mount 18. The visor mount 18 is mounted to the header 14 by fasteners 20. It will be appreciated by those of skill in the art that a variety of fasteners 20 may be used to secure the sun visor assembly 12 to the header 14, including, but not limited to, bolts, screws, rivets, pins, and the like. A visor pivot rod 22 interconnects the visor panel 24 and the visor mount 18.

The visor pivot rod 22 is pivotably connected to the visor mount 18 so the visor panel 24 can be placed in several positions, including a retained position where the visor panel 24 is adjacent and substantially parallel to a plane containing the vehicle roof 26. The visor panel 24 can also be disposed in a first deployed position 28 where the visor panel covers an upper portion of the windshield 30 so that incident sun light is blocked from entering a vehicle passenger's eyes. The pivot connection between the visor pivot rod 22 and the visor mount 18 also allows the visor panel 24 to swivel from the first deployed position 28 to a second deployed position covering an upper portion of a side window 32. The sun visor assembly 12 is located proximate an overhead airbag module 33 that is disposed between the headliner 16 and the vehicle roof 26.

The visor mount 18 is secured to the header 14 on an outboard side 34 of the vehicle 10 proximate the top 36 and outboard 38 edges of the visor panel 24. The visor panel 24 also has a bottom edge 40 and an inboard edge 42. The pivot rod 22 has a first portion 46 that extends from the outboard edge 38 toward the inboard edge 42, adjacent and substantially parallel to the bottom edge 40 of the visor panel 24. The visor panel 24 is rotatably connected to the first portion 46 of the pivot rod 22 allowing the visor panel 24 to rotate along an axis collinear with the first portion 46 of the pivot rod 22.

The pivot rod 22 has a second portion 48 that interconnects the first portion 46 and the visor mount 18, but extends adjacent the top edge 36 toward the bottom edge 40, alongside the outboard edge 38 of the visor panel 24. As depicted in FIG. 1, the second portion 48 is substantially perpendicular to the first portion 46 of the pivot rod 22. The visor panel 24 is detachably connected to the second portion 48 of the pivot rod 22 by a deflecting element 50. The deflecting element 50 shown is a catch mechanism 52. The catch mechanism 52 holds the visor panel 24 in position next to the second portion 48 of the pivot rod 22 until a force is applied against the visor panel 24 to release it from the catch mechanism 52 connecting it to the second portion 48. It will be appreciated by those of skill in the art that a variety of catch mechanisms 52 may be used to detachably secure the visor panel 24 adjacent the second portion 48 of the pivot rod 22, including, but not limited to, a ball bearing detent, a ball and spring detent, a frangible nylon pin, or a detachable sewn on strap. The catch mechanism 52 depicted detachably interconnects the outboard edge 34 of the visor panel 24 and the second portion 48 of the pivot rod 22 and is located near the top edge 36 of the visor panel 24 adjacent the visor mount 18.

It is also possible for the pivot rod 22 to have a third portion that could extend adjacent the inboard edge 42 of the visor panel 24. The third portion would interconnect the first portion 46 of the pivot rod 22 and a second mount on an inboard side 44 of the vehicle 10. The visor panel 24 would have to be detachably connected to the third portion through a catch mechanism much like the one located on the outboard edge 38 of the visor panel 24.

Figure 2:
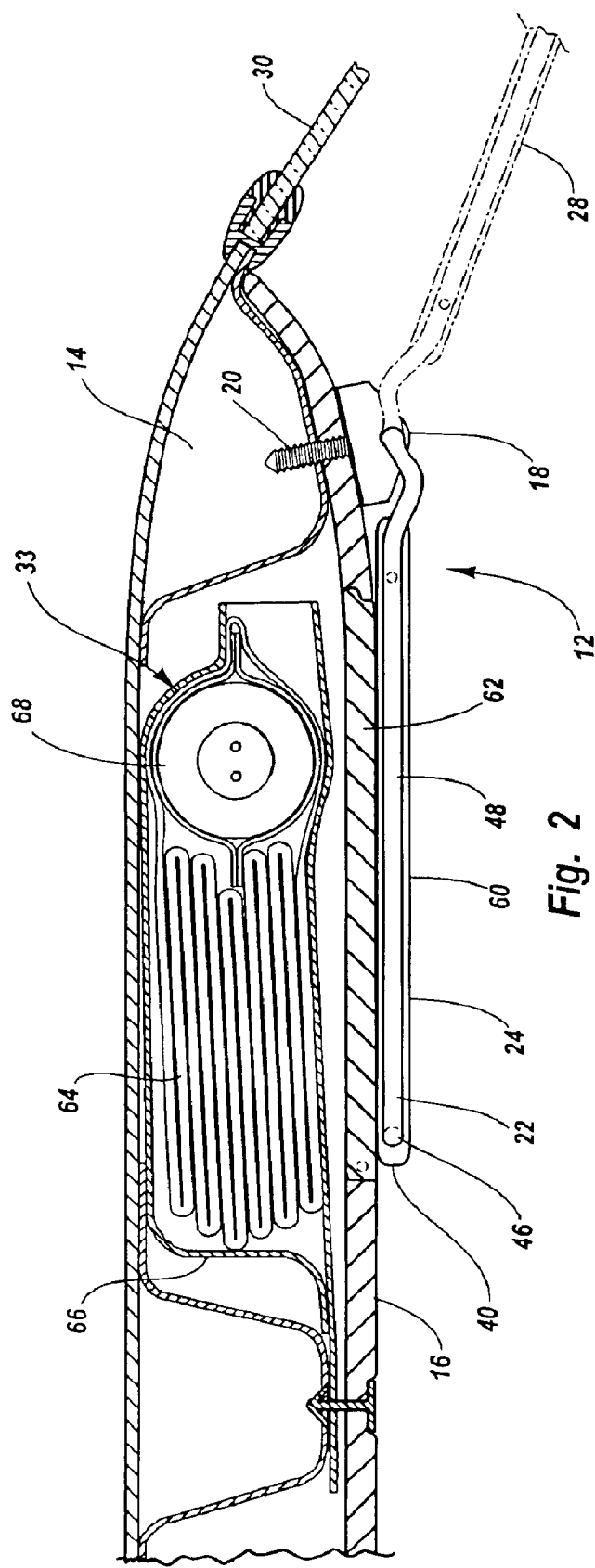
FIG. 2 is a side elevation, sectional view of the sun visor assembly beneath the overhead airbag module when the airbag is in an inactivated state.

Referring to FIG. 2, the visor panel 24 is shown in a side elevation, sectional view, disposed in the retained position 60 below the overhead airbag module 33. The visor panel 24 can also be disposed in the first deployed position 28 where it covers an upper portion of the windshield 30. The overhead airbag module door 62 is disposed in the headliner 16 and between the visor panel 24 in the retained position 60 and the overhead airbag module 33. The overhead airbag 64 is able to deploy through the door 62 upon activation and inflation. FIG. 2 also shows the overhead airbag 64 folded in an uninflated state within the housing 66 of the overhead airbag module 33. The overhead airbag module 33 further has an inflator 68 disposed within its housing 66 for inflating the overhead airbag 64 in a collision.

The sun visor assembly 12 is secured to the header rail 14 by at least one fastener 20. The visor panel 24, therefore, covers at least a portion of the overhead airbag module door 62 or outlet through which the overhead airbag 64 may deploy. The side elevation, sectional view shown in FIG. 2 is from an outboard side of the vehicle looking toward the inboard side. The second portion 48 of the pivot rod 22 is shown adjacent the visor panel 24, interconnecting the visor mount 18 and the first portion 46 of the pivot rod 22 at the bottom edge 40 of the visor panel 24.

Figure 3:
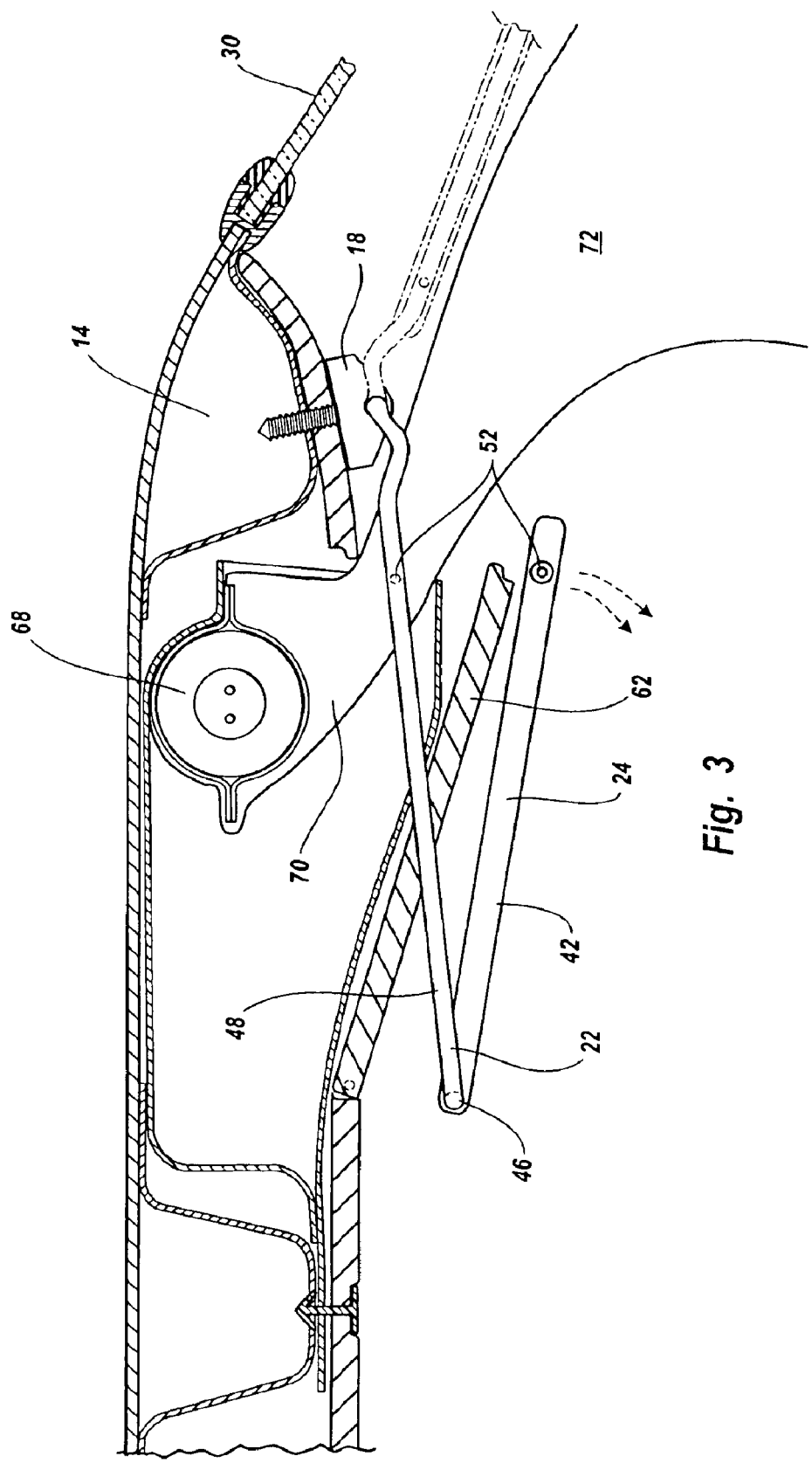
FIG. 3 is a side elevation, sectional view of the sun visor assembly being deflected out of the trajectory of the activated overhead airbag.

Referring to FIG. 3, the visor panel 24 is shown in a side elevation, sectional view, deflected by the force exerted by the activated overhead airbag 70. As the inflator 68 fills the activated overhead airbag 70, the force of the expanding airbag cushion 72 pushes against the visor panel 24 or against the overhead airbag module door 62, which in turn pushes against the visor panel 24 when in a retained position. This force causes the catch mechanism 52 to separate, thereby disconnecting the inboard edge 42 of the visor panel 24 from the second portion 48 of the pivot rod 22.

The expanding airbag cushion 72 extends in a trajectory alongside the windshield 30 and in front of a vehicle passenger. The detached visor panel 24 swings away from the trajectory of the expanding airbag cushion 72 by rotating along an axis collinear with the first portion 46 of the pivot rod 22. In this configuration the visor pivot rod 22 does not interact with the expanding airbag cushion 72 and does not separate from the header rail 14 or from the visor mount 18. Furthermore, as the visor panel 24 is capable of swinging out of the trajectory of the expanding airbag cushion 72, the visor panel 24 does not fragment creating a dangerous projectile in the passenger compartment of the vehicle.

Figure 4:
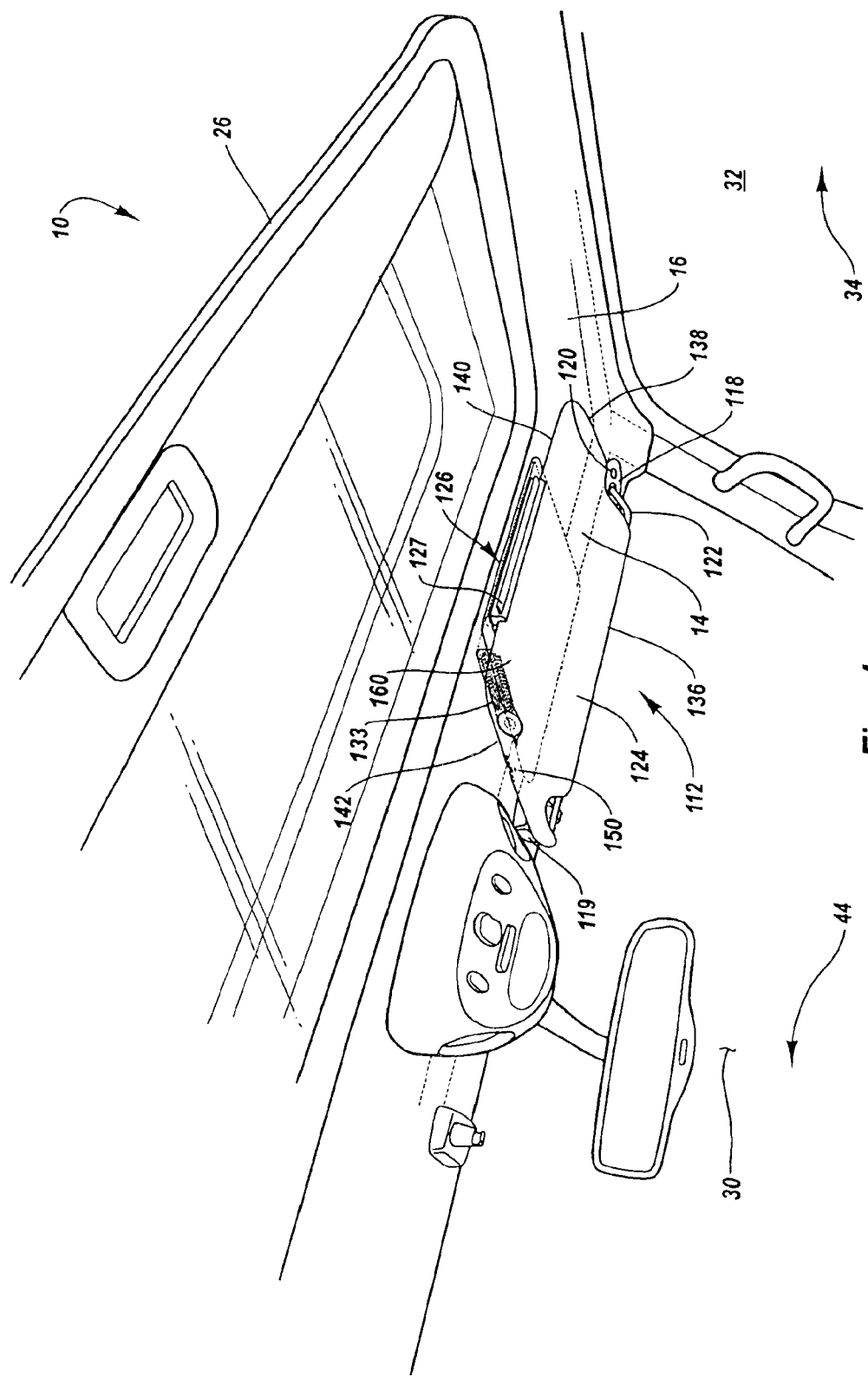
FIG. 4 is a perspective view of the inside of a motor vehicle incorporating another embodiment of a sun visor assembly in the retained position, below an overhead airbag module.

Referring to FIG. 4, an alternative embodiment of a sun visor assembly 112 is shown from a perspective view inside a passenger compartment of a vehicle 10. The sun visor assembly 112 is mounted to the header 14 through the headliner 16 by a first visor mount 118. The first visor mount 118 is secured to the header 14 through at least one fastener 120. It will be appreciated by those of skill in the art that a variety of fasteners 120 may be used to secure the sun visor assembly 112 to the header 14, including, but not limited to, bolts, screws, rivets, pins, and the like.

A visor pivot rod 122 pivotably interconnects the visor panel 124 and the first mount 118. The first mount 118 is located proximate a top edge 136 of the visor panel 124 on an outboard side 34 of the vehicle 10. The pivot rod 122 extends along the top edge 136 of the visor panel 124 so that the visor panel 124 can rotate about an axis collinear with the pivot rod 122. The visor panel 124 is depicted in a retained position 160, such that the visor panel 124 is adjacent the headliner 16 and substantially parallel to a plane containing the roof 26 of the vehicle 10. In the retained position 160, the visor panel 124 is positioned below the overhead airbag module 133. The visor panel 124 could be maintained in the retained position 160 by a locking mechanism 126 that engages a bottom edge 140 of the visor panel 124. However, a locking mechanism 126 could possibly engage other edges of the visor panel 124, such as the outboard edge 138 or the inboard edge 142. The locking mechanism 126 could also have a release lever 127 that would release the bottom edge 140 of the visor panel 124 through a hinge, spring or similar mechanism for disengaging the visor panel 124 from the locking mechanism 126. Furthermore, the visor panel 124 could contain a deflecting element 150 for allowing the visor panel 124 to deform out of the locking mechanism 126 and out of the path of an activated overhead airbag. The deflecting element 150 will be discussed with greater detail in conjunction with FIG. 6.

A second mount 119 may also be used as a detachable clip to secure the sun visor assembly 112 to the header 14. The second mount 119 is located on an inboard side 44 of the vehicle 10. In a two-mount system, the pivot rod 122 would interconnect the two mounts 118, 119. In this configuration the pivot rod 122 could become detached from the second mount 119, allowing the visor panel 124 to cover not only an upper portion of the windshield 30, but also swivel to cover an upper portion of a side window 32.

Figure 5:
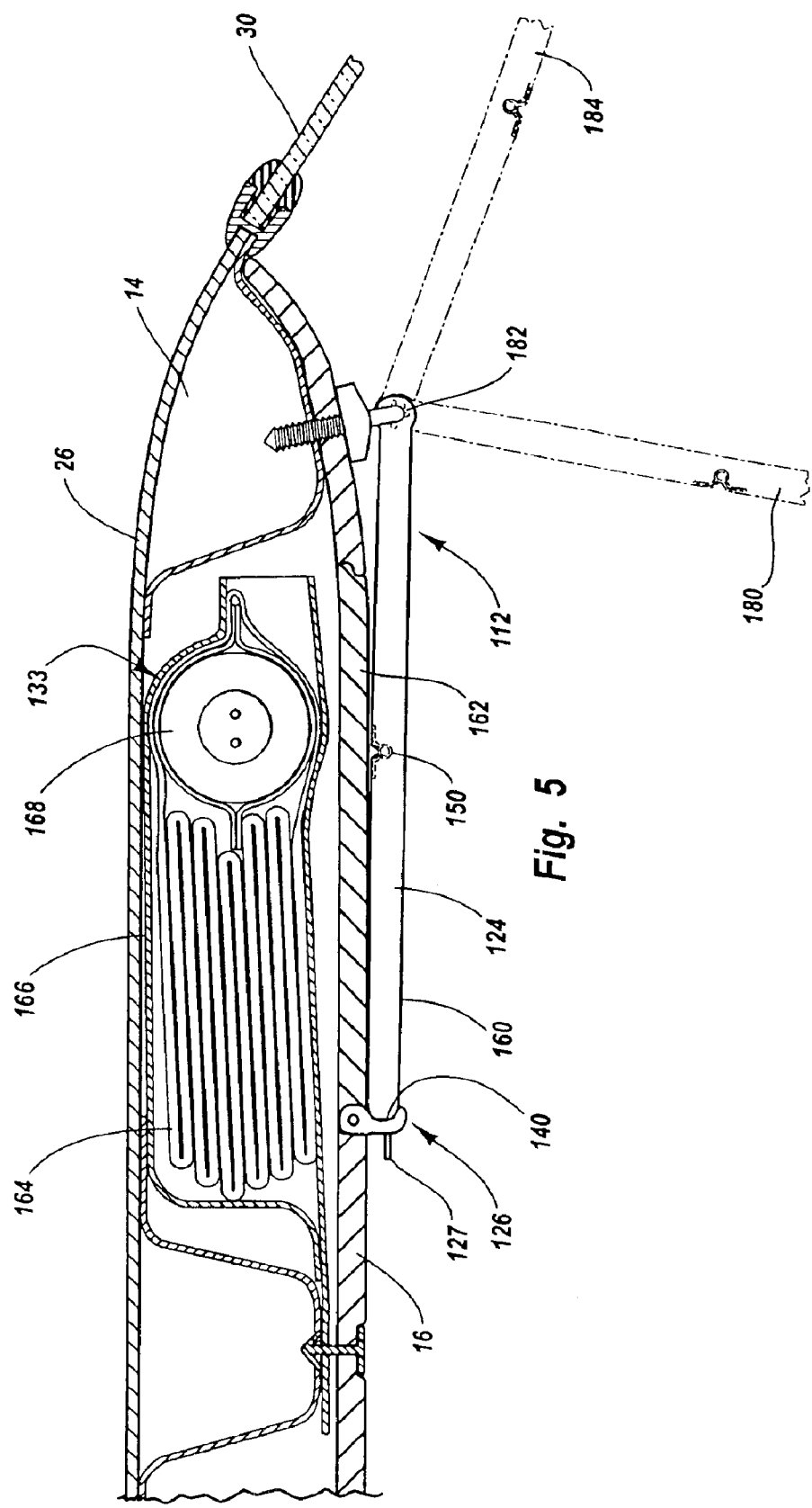
FIG. 5 is a side elevation, sectional view of the sun visor assembly beneath the overhead airbag module when the airbag is in an inactivated state.

Referring to FIG. 5, the sun visor assembly 112 is shown in a side elevation, sectional view, mounted to the vehicle header 14 so that the visor panel 124 is underneath the overhead airbag module 133. The overhead airbag module 133 is disposed between the headliner 16 and the vehicle roof 26 and has a housing 166 which contains an airbag inflator 168 and a folded overhead airbag 164 in an uninflated state. The overhead airbag module door 162 is depicted in the headliner 16 between the overhead airbag module housing 166 and the visor panel 124. When the sun visor assembly 112 is not in use, the visor panel 124 can be disposed in a retained position 160, adjacent the overhead airbag module 133. The visor panel 124 is maintained in the retained position 160 by a locking mechanism 126 that engages a bottom edge 140 of the visor panel 124. The visor panel 124 can be released from the locking mechanism 126 in several ways. First, as will be discussed in conjunction with FIG. 6, the visor panel 124 can be deflected out of the retained position 160 by deforming at the deflecting element 150. Second, a vehicle passenger could pivot the locking mechanism 126 by actuating the release lever 127.

Once the visor panel 124 is released from the retained position 160, it moves automatically to a first deployed position 180 by virtue of gravity, a spring, or other known method for facilitating movement. The visor panel 124 is maintained in the first deployed position 180 by a detent mechanism 182. The visor panel can then be manually disposed in a number of additional deployed positions 184 by the vehicle passenger. The optimal deployed position of the visor panel 124 is dependent upon the incidence angle of sun light through the windshield 30, the height of the vehicle passenger, and the desired portion of the windshield 30 to be left uncovered for optimal viewing. Each additional deployed position 184 of the visor panel 124 could be maintained in position by a detent mechanism 182, or through friction, or a pawl and ratchet wheel or similar means.

Figure 6:
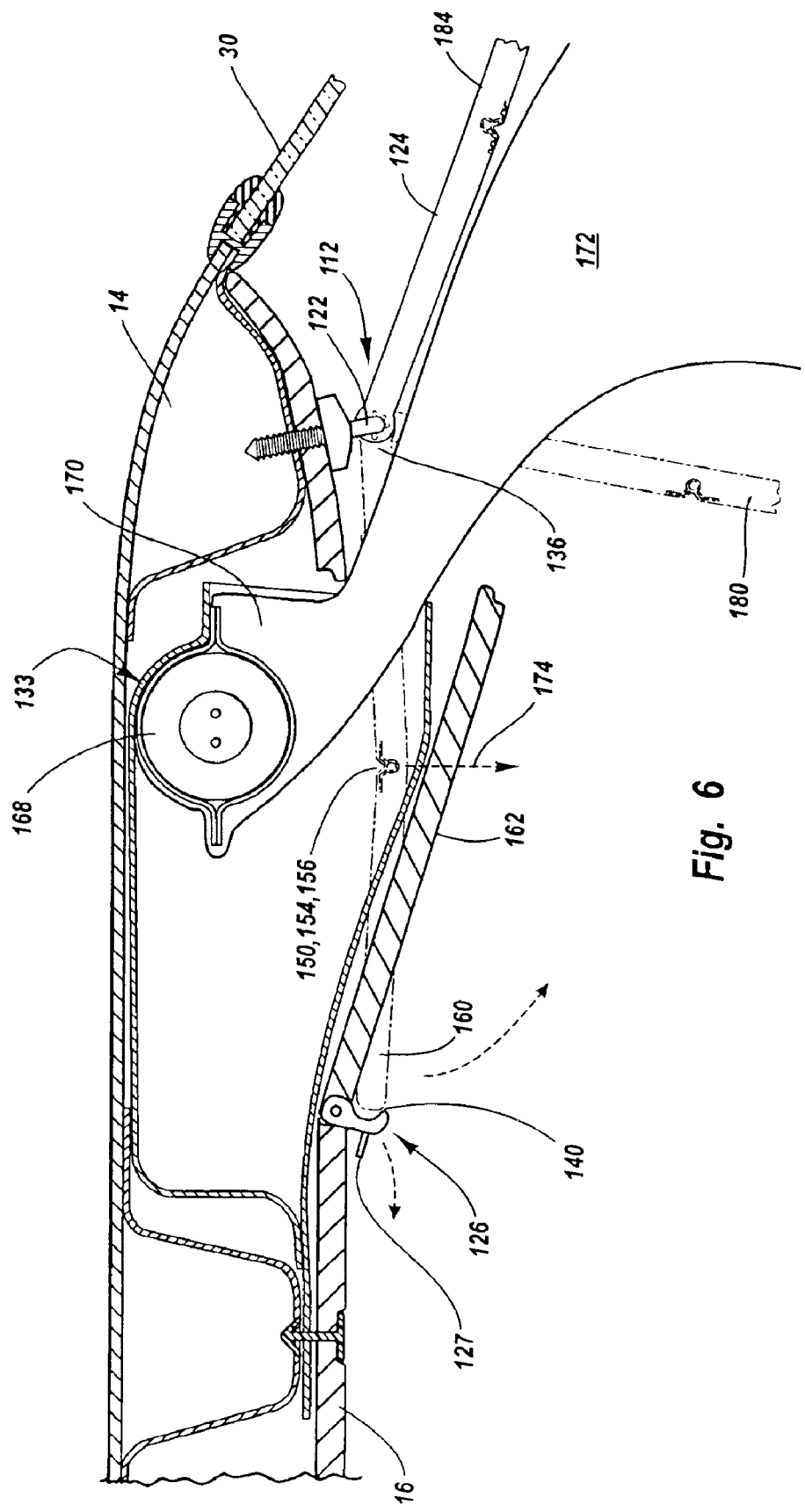
FIG. 6 is a side elevation, sectional view of the sun visor assembly being deflected out of the trajectory of the activated overhead airbag.

Referring to FIG. 6, the visor panel 124 of the sun visor assembly 112 is shown in a side elevation, sectional view deflected out of the path of the activated overhead airbag 170. As the inflator 168 fills the activated overhead airbag 170, the expanding airbag cushion 172 either exerts a force directly against the visor panel 124 or pushes the door 162 of the overhead airbag module 133 against the visor panel 124 in the retained position 160. The force causes the deflecting element 150 to bend downward 174 along a length of the visor panel 124. The deflecting element 150 could be a spring loaded pivot 154 or a crease 156 disposed approximately midway between the top edge 136 and the bottom edge 140 of the visor panel 124. The crease 156 would extend the length of the visor panel 124 from the outboard edge to the inboard edge.

As the visor panel 124 bends at the deflecting element 150, it can be released from the locking mechanism 126 without actuating the release lever 127. The visor panel 124 then automatically swings from the retained position 160 to the first deployed position 180. The visor panel 124 can further be pushed out of the trajectory of the expanding airbag cushion 172 by moving from the first deployed position 180 to another deployed position 184 adjacent the windshield 30 by rotating along an axis collinear with the pivot rod 122.

Figure 7C:
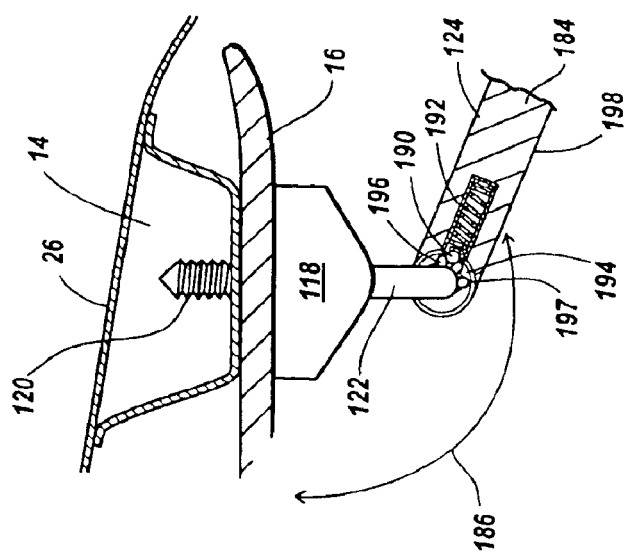
FIGS. 7A through 7C are a side elevation, sectional view of the portion of the sun visor assembly attached to the vehicle header rail in the retained position and a two deployed positions.
Figure 7B:
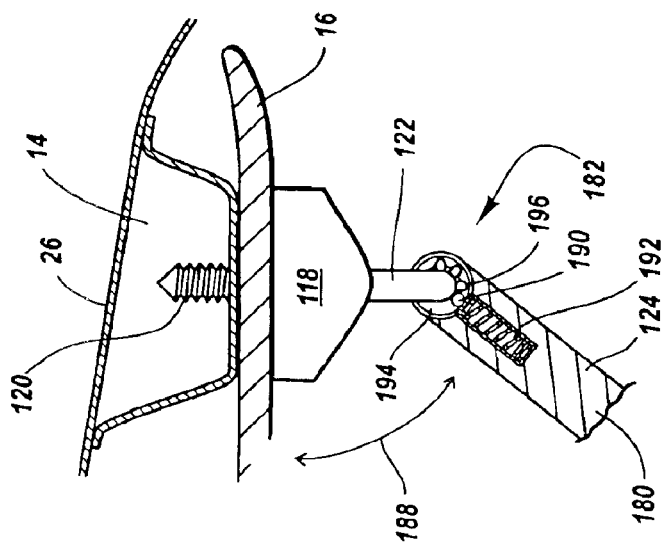
Figure 7A:
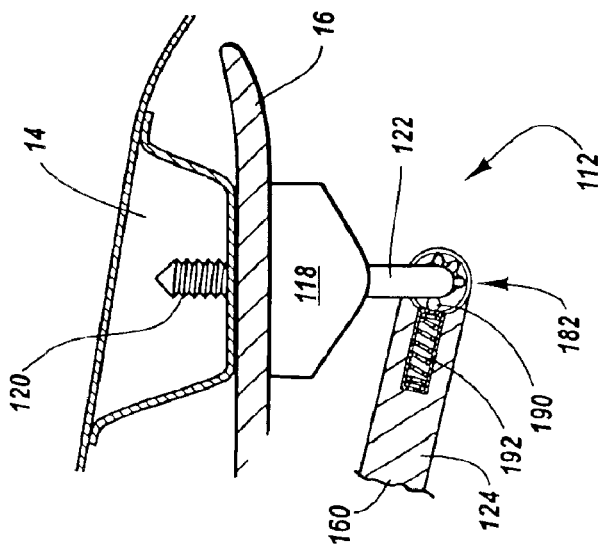

Referring to FIG. 7A, a portion of the sun visor assembly 112 is shown in a side elevation, sectional view attached to the header rail 14 through the headliner 16 by a fastener 120. The visor panel 124 is in the retained position 160 adjacent the overhead airbag module housing (not shown). The pivot rod 122 interconnects the first mount 118 and the visor panel 124. A detent mechanism 182 is located at the junction of the visor panel 124 and the pivot rod 122. The detent mechanism 182 can be a ball 190 and spring 192 detent.

When a vehicle passenger releases the visor panel 124 from the locking mechanism, the visor panel 124 swings from the retained position 160 to the first deployed position 180 as shown in FIG. 7B. In the illustrated embodiment, gravity allows the visor panel 124 to pivot away from the headliner 16. The ball 190 of the detent mechanism 182 follows a channel 194 until it abuts one of a plurality of fingers 196. The fingers 196 prevent the continued movement of the ball 190 in the channel 194 and consequently the continued movement of the visor panel 124, thereby retaining the visor panel 124 in a first deployed position 180.

The visor panel 124 can then be disposed in another deployed position 184 as shown in FIG. 7C by applying additional force against the front face 198 of the visor panel 124. This additional force pushes the ball 190 of the detent mechanism 182 against a sloped surface of one of the fingers 196. The ball 190 then travels toward the tip 197 of the finger 196, pushing against and tensioning the spring 192. Once the ball 190 has passed the tip 197 of the finger 196, the spring 192 pushes the ball 190 back into the channel 194 between fingers 196. The force of the spring 192 pushing against the ball 190 is sufficient to maintain the visor panel 124 in a desired deployed position 184 despite the effects of gravity.

Each additional deployed position 184 defines an angle 186 between the visor panel 124 and the vehicle roof 26 greater than the angle 188 defined by the previous deployed position (see FIG. 7B). The requisite force needed to move the visor panel 124 into another deployed position must be sufficient to overcome the force exerted by the spring 192 against the ball 190. The force of an expanding airbag cushion against the visor panel 124 is sufficient to push the visor panel 124 into a deployed position 184 out of a trajectory of the expanding airbag cushion.

Figure 8B:
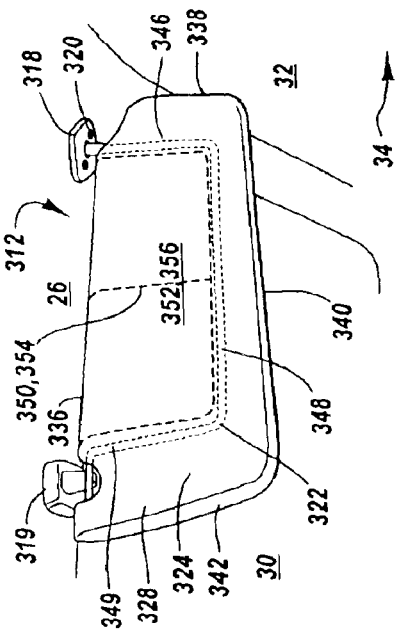
FIGS. 8B through 8D are a perspective view of several other alternative embodiments of the sun visor assembly in deployed positions.
Figure 8D:
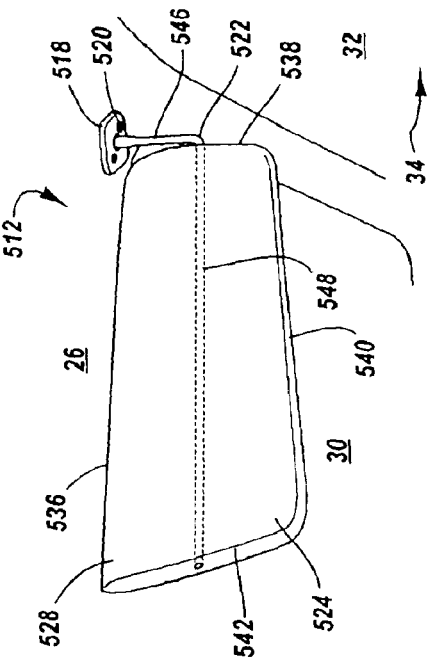
Figure 8A:
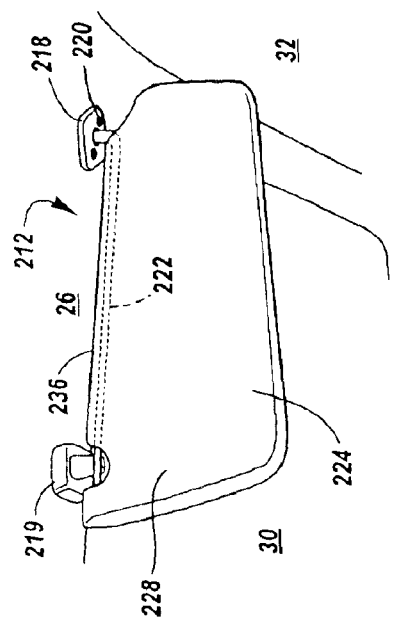
FIG. 8A is a perspective view of a conventional prior art sun visor in a deployed position.

Referring to FIG. 8A, a conventional sun visor assembly 212 is shown from a perspective view inside a passenger compartment of a vehicle. The conventional sun visor assembly 212 has first and second visor mounts 218, 219 (respectively) fastened to a vehicle by fasteners 220. A visor pivot rod 222 is pivotably connected to the first mount 218 so the visor panel 224 can be disposed in a retained position adjacent the vehicle roof 26, a first deployed position 228 covering an upper portion of the windshield 30, and a second deployed position covering an upper portion of the side window 32. The pivot rod 222 is attached to the visor panel 224, and detachably connected to the second mount 219 so the visor panel 224 can swivel from the first deployed position 228 to the second deployed position. The pivot rod 222 runs adjacent the top edge 236 of the visor panel 224. The pivot rod 222 in this configuration would interfere with a trajectory of an activated overhead airbag and could separate from its attachment.

FIG. 8B illustrates another alternative embodiment of the sun visor assembly 312 of the present invention as shown from a perspective view inside a passenger compartment of a vehicle. The sun visor assembly 312 has a first mount 318 fastened to a vehicle on an outboard side 34 by at least one fastener 320. A visor pivot rod 322 is attached to a visor panel 324 and pivotably connected to the first mount 318 so the visor panel 324 can be stowed in either a retained position adjacent the overhead airbag module and the vehicle roof 26, a first deployed position 328 covering an upper portion of the windshield 30, or a second deployed position covering an upper portion of the side window 32.

The pivot rod 322 is also detachably connected to a second mount 319 so the visor panel 324 can swivel from the first deployed position 328 to the second deployed position if desired. The first and second mounts 318, 319 (respectively) are attached to a header rail in the vehicle frame for rigid attachment. The mounts could be secured elsewhere, as long as they were rigidly attached so that they do not separate when a vehicle passenger actuates the sun visor assembly 312.

Referring still to FIG. 8B, the pivot rod 322 has a first portion 346 that runs from the first mount 318 to the top edge 336 of the visor panel 324 and along a length adjacent the outboard edge 338 of the visor panel 324 toward the bottom edge 340. A second portion 348 of the pivot rod 322 then runs from the first portion 346 on the outboard edge 338 toward the inboard edge 342 and along a length adjacent and substantially parallel to the bottom edge 340 of the visor panel 324. A third portion 349 of the pivot rod 322 then runs from the second portion 348 at the bottom edge 340 of the visor panel 324 toward the top edge 336 along a length adjacent to the inboard edge 342 of the visor panel 324. The third portion 349 of the pivot rod 322 then detachably connects to the second mount 319. The three portions of the pivot rod 322 form somewhat of a U-shape throughout the visor panel 324. Consequently, the pivot rod 322 does not run alongside the top edge 336 of the visor panel 324, so it does not contact the deploying overhead airbag.

An area 352 of the visor panel 324 is defined by the first, second, and third portions 346, 348, 349 (respectively) of the pivot rod 322 and the top edge 336 of the visor panel 324. A deflecting element 350 is disposed within the area 352 for deflecting out of the path of an inflating overhead airbag cushion, such that the sun visor assembly 312 does not separate from the first mount 318 or from the header of the vehicle. The deflecting element 350 in FIG. 8B comprises a tear seam 354 that gives way under the force of the impending activated overhead airbag. Flexible fabric or a pliable substrate could also be used instead of the tear seam 354 for deflecting out of the way of the activated overhead airbag. The visor panel 324 with the deflecting element 350 does not impede the trajectory of the inflating cushion and allows for proper deployment and placement of the inflated cushion for maximum protection of the vehicle passenger in the event of a collision. The area 352 of the visor panel 324 containing the deflecting element 350 that is deformed also defines a channel 356 through which the inflating cushion is guided into a proper deployment position providing maximum cushioning protection for the vehicle passenger.

Figure 8C:
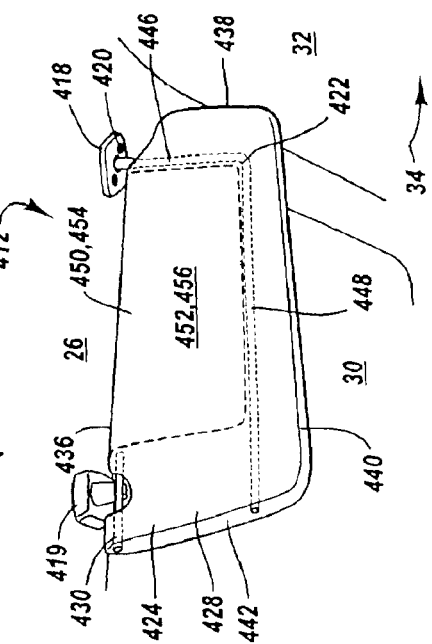

FIG. 8C also illustrates another alternative embodiment of the sun visor assembly 412 as shown from a perspective view inside a passenger compartment of a vehicle. The sun visor assembly 412 has a first mount 418 fastened to a vehicle on an outboard side 34 by at least one fastener 420. A visor pivot rod 422 is attached to a visor panel 424 and pivotably connected to the first mount 418 so the visor panel 424 can be stowed in either a retained position adjacent the overhead airbag module and the vehicle roof 26, a first deployed position 428 covering an upper portion of the windshield 30, or a second deployed position covering an upper portion of the side window 32.

A second mount 419 is connected to an attachment rod 430 disposed adjacent the top edge 436 of the visor panel 424. The visor panel 424 is detachably connected to the second mount 419 so the visor panel 424 can swivel from the first deployed position 428 to the second deployed position if desired. The first and second mounts 418, 419 (respectively) are attached to a header rail for rigid attachment of the sun visor assembly 412.

The pivot rod 422 has a first portion 446 that extends from the first mount 418 to the top edge 436 of the visor panel 424 and along a length adjacent the outboard edge 438 toward the bottom edge 440. A second portion 448 of the pivot rod 422 then runs from the first portion 446 on the outboard edge 438 of the visor panel 424 toward the inboard edge 442 and along a length adjacent and substantially parallel to the bottom edge 440 of the visor panel 424. Consequently, the second portion 448 of the pivot rod 422 is substantially perpendicular to the first portion 446, and the pivot rod 422 does not run alongside the top edge 436 of the visor panel 424 so it does not contact the deploying overhead airbag.

The top edge 436 of the visor panel 424 between the first and second mounts 418, 419 (respectively), and the first 446 and second portion 448 of the pivot rod 422 define an area 452 of the visor panel 424 containing a deflecting element 450. The deflecting element 450 is a flexible portion of the visor panel 424 that could be made of flexible fabric 454, a pliable substrate or a tear seam. In the current embodiment, the flexible fabric 454 can deform out of a trajectory of an inflating overhead airbag cushion, such that the sun visor assembly 412 does not separate from the first mount 418 or from the header of the vehicle. The area 452 of the visor panel 424 containing the deflecting element 450 also defines a channel 456 through which the inflating cushion is guided into a proper deployment position providing maximum protection of the vehicle passenger in the event of a collision.

Referring to FIG. 8D, yet another alternative embodiment of the sun visor assembly 512 is depicted from a perspective view inside a passenger compartment of a vehicle. The sun visor assembly 512 has a mount 518 that secures it to the vehicle on an outboard side 34 through one or more fasteners 520. The mount 518 could be secured to the header rail or another rigid attachment location of the vehicle. A visor pivot rod 522 is rotatably attached to a visor panel 524 and pivotably connected to the mount 518. This configuration allows the visor panel 524 to be stowed in either a retained position adjacent the overhead airbag module and the vehicle roof 26, a first deployed position 528 covering an upper portion of the windshield 30, or a second deployed position covering an upper portion of the side window 32.

The pivot rod 522 has a first portion 546 that extends from the mount 518 to an outboard edge 538 of the visor panel 524 midway between the top 536 and bottom 540 edges. A second portion 548 of the pivot rod 522 then runs from the first portion 546 on the outboard edge 538 of the visor panel 524 toward the inboard edge 542 substantially parallel and in between the top edge 536 and the bottom edge 540 of the visor panel 524. The visor panel 524 is rotatably connected to the second portion 548 of the pivot rod 522 along an axis collinear with the second portion 548.

The pivot rod 522 could possibly have a third portion that extends from the second portion 548 of the pivot rod 522 out from the inboard edge 542 of the visor panel 524 adjacent the inboard edge 542 toward the top edge 536, and detachably connecting to a second mount.

When the visor panel 524 is disposed in a retained position proximate the overhead airbag module, the visor panel 524 can rotate along the second portion 548 of the pivot rod 522 when a force from an inflating overhead airbag cushion is applied against the top edge 536 of the visor panel 524. The visor panel 524 then rotates away from the overhead airbag module outlet or door and away from the trajectory of the inflating airbag cushion so as not to impede the inflation trajectory or become separated from the mount 518 or attachment.

Accordingly, the sun visor assembly of the present invention presents significant improvements in addressing the problems of sun visor compatibility with overhead airbags. By allowing the visor panel to deflect out of the trajectory of the inflating overhead airbag cushion and altering the placement of the visor pivot rod, the sun visor does not fragment or separate from its attachment which could cause injury to the vehicle occupants. The visor panel also deflects out of the path of the inflating overhead airbag in a manner that does not impede the deployment of the airbag, thereby positioning the cushion correctly for proper occupant restraint. The normal operation and installation of the aforementioned sun visor assemblies also does not deviate markedly from that of conventional sun visor operation and installation. This prevents consumer frustration and confusion with sun visor operation as well as avoiding expensive installation procedures.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A sun visor assembly for a vehicle to be used in conjunction with an overhead airbag, comprising:
   a visor panel;
   a rod member that is attached to the visor panel;
   a first mount for interconnecting the rod member and the vehicle wherein the rod member is pivotably connected to the first mount so the visor panel can be disposed in a first deployed position and a retained position; and
   a deflecting element comprising a releasable catch mechanism for allowing the visor panel to be deflected out of a trajectory of the overhead airbag upon activation without fragmenting the visor panel or separating the sun visor assembly from the vehicle, wherein the first deployed position of the visor panel covers an upper portion of a side of a windshield of the vehicle, and wherein the visor panel can be disposed in a second deployed position that covers an upper portion of a side window of the vehicle.

2. The sun visor assembly of claim 1, wherein the retained position of the visor panel is proximate an overhead airbag module such that the visor panel is substantially parallel to a plane containing a roof of the vehicle.

3. The sun visor assembly of claim 2, further comprising a second mount for interconnecting the sun visor assembly and the vehicle, wherein the second mount is located on an inboard side of the vehicle and the first mount is located on an outboard side of the vehicle.

4. The sun visor assembly of claim 3, wherein the visor panel is capable of becoming detached from the second mount so the visor panel can be disposed in the second deployed position.

5. The sun visor assembly of claim 4, wherein the first and second mounts are fastened to a header of the vehicle.

6. The sun visor assembly of claim 1, wherein the visor panel has a top and bottom edge;
   the rod member is rotatably connected along the top edge of the visor panel creating an axis of rotation collinear with the rod member;
   the visor panel is held in the retained position by a locking mechanism such that the visor panel can be released from the locking mechanism by a vehicle passenger, whereupon the visor panel moves from the retained position to the first deployed position; and
   the deflecting element allows the visor panel to be temporarily deformed when a force is applied against the visor panel upon activation of the overhead airbag such that the visor panel is released from the locking mechanism and moves out of the retained position away from the trajectory of the overhead airbag.

7. The sun visor assembly of claim 1, wherein the visor panel has a top and bottom edge, the top edge being adjacent the first mount;
   the rod member has a portion that extends along a length parallel to, but not proximate the top edge of the visor panel such that the rod member does not impede the trajectory of the overhead airbag upon activation; and
   the visor panel is capable of being deformed out of the trajectory of the overhead airbag upon activation.

8. A sun visor assembly for a vehicle to be used in conjunction with an overhead airbag, comprising:
   a visor panel having an outboard and inboard edge, and a top and bottom edge;
   a rod member having a first portion that extends adjacent and is rotatably connected to the bottom edge of the visor panel, and a second portion that extends adjacent and is detachably connected to the outboard edge of the visor panel;
   a mount interconnecting the rod member and the vehicle such that the rod member is pivotably connected to the mount so the visor panel can be disposed in a first deployed position and a retained position; and
   wherein the visor panel is capable of detaching from the second portion of the rod member and rotating along an axis collinear with the first portion of the rod member out of a trajectory of the overhead airbag when a force is applied against the visor panel upon activation of the overhead airbag.

9. The sun visor assembly of claim 8, wherein the outboard edge of the visor panel is detachably connected to the second portion of the rod member by a catch mechanism.

10. The sun visor assembly of claim 9, wherein the catch mechanism is located proximate the top edge of the visor panel.

11. The sun visor assembly of claim 10, wherein the first portion of the rod member is substantially perpendicular to the second portion of the rod member.

12. The sun visor assembly of claim 11, wherein the retained position of the visor panel is proximate an overhead airbag module and the visor panel is substantially parallel to a plane containing a roof of the vehicle.

13. The sun visor assembly of claim 12, wherein the first deployed position of the visor panel covers an upper portion of a side of a windshield of the vehicle.

14. The sun visor assembly of claim 13, wherein the visor panel can be disposed in a second deployed position that covers an upper portion of a side window of the vehicle.

15. A sun visor assembly for a vehicle to be used in conjunction with an overhead airbag, comprising:
   a visor panel;
   means for supporting the visor panel in a retained position and a first deployed position;
   a first mount for attaching the sun visor assembly adjacent a roof of the vehicle, wherein the supporting means is pivotably connected to the first mount so the visor panel can be disposed in the retained position and the first deployed position; and
   means comprising a releasable catch mechanism for allowing the visor panel to be deflected out of a trajectory of the overhead airbag upon activation without fragmenting the visor panel or separating the sun visor assembly from the vehicle, wherein the first deployed position of the visor panel covers an upper portion of a side of a windshield of the vehicle, and wherein the visor panel can be disposed in a second deployed position that covers an upper portion of a side window of the vehicle.

16. The sun visor assembly of claim 15, further comprising a second mount for attaching the sun visor assembly adjacent a roof of the vehicle, wherein the second mount is located on an inboard side of the vehicle and the first mount is located on an outboard side of the vehicle.

17. The sun visor assembly of claim 16, wherein the visor panel is capable of becoming detached from the second mount so the visor panel can be disposed in the second deployed position.

18. The sun visor assembly of claim 17, wherein the first and second mount are fastened to a header of the vehicle.

19. A sun visor assembly for a vehicle to be used in conjunction with an overhead airbag, comprising:
   a visor panel;
   a rod member that is attached to the visor panel;
   a first mount for interconnecting the rod member and the vehicle wherein the rod member is pivotably connected to the first mount so the visor panel can be disposed in a first deployed position and a retained position;

a deflecting element for allowing the visor panel to be deflected out of a trajectory of the overhead airbag upon activation without fragmenting the visor panel or separating the sun visor assembly from the vehicle;

wherein the visor panel has an outboard and inboard edge, and a top and bottom edge and the rod member having a first portion that extends adjacent to and is rotatably connected to the bottom edge of the visor panel, the rod member further having a second portion that extends adjacent to and is detachably connected to the outboard edge of the visor panel and wherein the visor panel detaches from the second portion of the rod member and rotates along an axis collinear with the first portion of the rod member out of the path of the overhead airbag when a force is applied against the visor panel upon activation of the overhead airbag.

* * * * *